Patented May 3, 1938

2,115,848

UNITED STATES PATENT OFFICE 2,115,848

EPHEDRINE COMPOSITION

Dudley H. Grant, Watchung, N. J., assignor to Stanco Incorporated, a corporation of Delaware No Drawing. Application December 29, 1934, Serial No. 759,769

3 Claims. (Cl. 167—58)

This invention relates to ephedrine compositions suitable for treatment of the nasal passages, and particularly to an improved aqueous composition of ephedrine suitable for use as a nasal douche.

Ephedrine is used widely for treating colds, asthma, sinus congestions and similar nasal disturbances on account of its specific action in shrinking the nasal mucosa. It has been applied heretofore by spraying, or applying soaked tampons, or dropping aqueous solutions of its hydrochloride or sulfate into the nose, or by similarly applying solutions of the free alkaloids in oily vehicles.

It has now been discovered that mildly alkaline aqueous solutions of ephedrine possess many advantages in nasal applications to the ephedrine solutions hitherto used. These mildly alkaline solutions, preferably adjusted to be isotonic or mildly hypertonic with relation to the nasal secretions, may contain much smaller concentrations of ephedrine than hitherto used and can be used with more positive and gentle or less irritating effects than possible with the previous preparations. While these mildly alkaline solutions are preferably used as a nasal douche, similar compositions containing preferably somewhat larger concentrations of ephedrine may be used as drops or spray or saturated tampons.

The improved ephedrine compositions described herein are preferably made alkaline with a weak alkali such as borax or sodium bicarbonate in proper concentration to produce a mild alkaline reaction (pH of 7.1 or preferably 7.5 to about 9). The solution may also contain sodium chloride, and also glycerine or other suitable penetrants and solvents, including the alkyl glycols of preferably less than 6 carbon atoms, such as propylene glycol, and also alkyl ethers thereof, such as diethylene glycol mono-ethyl ether, all these ingredients being so proportioned as to make the solution, when applied, isotonic or slightly hypertonic with respect to the nasal secretions. A preservative or disinfectant such as methyl para hydroxy benzoate, phenol, trichlor tertiary butyl alcohol, and the like, may also be added. These may also serve as local anesthetics, and other local anesthetics, such as methyl p-amino benzoate, may also be added. By suitably adjusting the proportions of the alkali, salt, glycerine, water and ephedrine, it is possible to retain a mild alkaline reaction, to retain the alkaloid in permanent solution even on dilution with several parts of water, and to produce a solution in which the combined effect of all salts used is one of isotonicity or slight hypertonicity with reference to the nasal secretions and is therefore non-irritating. Furthermore, such solutions are of low surface tension and have a penetrating and cleansing effect, loosening any thick mucus and bathing the mucous membrane in a mildly antiseptic bath. Such solutions preferably contain a low concentration of ephedrine, preferably from about 0.025% or 0.05% to 0.5% or 1%, the upper range of concentration being suitable for concentrated preparations to be diluted before use, and can be used safely with greater economy and in larger quantities than the oily or aqueous solutions usually prescribed, which contain about 1% to 3% ephedrine. When applied in the form of a douche, this composition acts on a larger surface of the mucous membrane, penetrates further into the nasal passages and acts more thoroughly than the usual drops, but with greater gentleness and consequently much less risk of the objectionable reactions which may follow an excessive use of ephedrine. It also appears that ephedrine is more readily adsorbed by the mucous membrane from an alkaline than from a neutral or acid solution, thereby causing more effective action.

The following example is presented to illustrate one suitable composition of ephedrine prepared according to the present invention. The various components of this composition are intended merely to be illustrative, as it is recognized that wide variations in the concentrations shown and substitution of other suitable salts, penetrants and antiseptics are readily apparent to those skilled in the art.

Nasal douche

| | | |
|---|---|---|
| Ephedrine hydrochloride | grams | 7 |
| Sodium chloride | do | 22 |
| Methyl para hydroxy benzoate | do | 0.52 |
| Sodium bicarbonate | do | 17 |
| Borax | do | 17 |
| Glycerine | c. c. | 22 |
| Distilled water | do | 1000 |

The above composition is a concentrated stock preparation which is preferably diluted, 1 part to 4 parts of water, before use. This composition can obviously be prepared in more concentrated or diluted form, keeping preferably, however, within the limits set out above as to concentration of ephedrine and of salt and alkalinity of the final composition.

This invention is not to be limited by any theoretical explanations or illustrative examples, which are presented herein solely for the purpose of illustration, but is limited only by the following claims in which it is desired to claim all novelty insofar as the prior art permits.

I claim:

1. A concentrated nasal douche adapted for dilution with four parts of water before use, comprising an aqueous solution containing, per 1,000 c. c. of water, approximately 7 grams of ephedrine hydrochloride, 22 grams of sodium chloride, 0.52 gram of methyl para hydroxy benzoate, 17 grams of borax, 17 grams of sodium bicarbonate and 22 c. c. of glycerine.

2. Nasal application comprising an aqueous solution of mild alkaline reaction containing from 0.025 to 1% of a salt of ephedrine dissolved therein, and a mildly basic salt to maintain said solution at a pH value between 7.1 and 9.

3. A concentrated nasal douche adapted for dilution with water before use, comprising an aqueous solution of mildly alkaline reaction containing from 0.025 to 1% of a salt of ephedrine dissolved therein and a mildly basic salt to maintain said solution at a pH value between 7.1 and 9, glycerine, sodium chloride and a preservative, which are not physiologically harmful.

DUDLEY H. GRANT.